March 29, 1966 J. W. SCHUCK 3,243,702
CONTROL APPARATUS
Filed Nov. 27, 1964
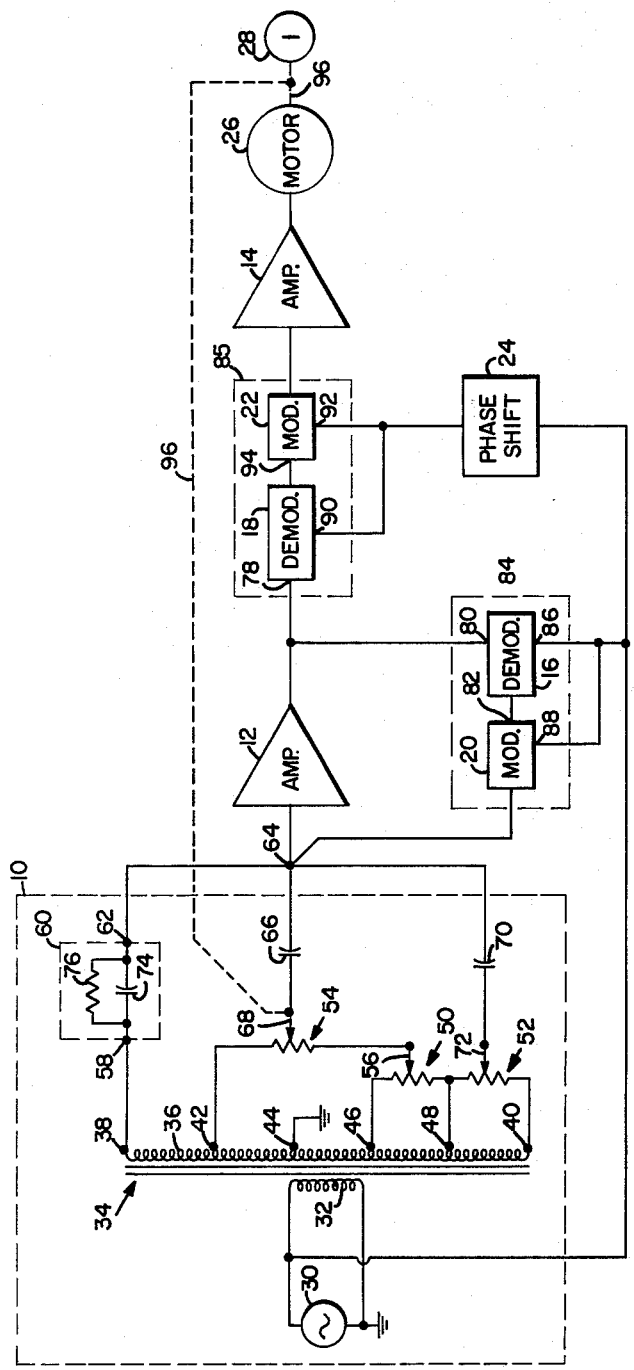
INVENTOR.
JACK W. SCHUCK
BY *Charles J. Ungemach*
ATTORNEY United States Patent Office 3,243,702
Patented Mar. 29, 1966

3,243,702
CONTROL APPARATUS
Jack W. Schuck, Minnetonka, Minn., assignor to Honeywell Inc., a corporation of Delaware
Filed Nov. 27, 1964, Ser. No. 414,153
1 Claim. (Cl. 324—61)

This invention relates to improvements in fluid quantity indicators and more particularly concerns a negative feedback amplifier.

In many fluid quantity indicators a signal, indicative of fluid quantity, having two components, is developed. For example, in an indicator using a capacitive sensor or probe, a signal having a capacitive (reactive) component and a resistive component may be developed. It is possible that either or both of the components of the signal are used in providing an indication of fluid quantity. If only one of the signal components is used for indicating purposes the other component sometimes creates a problem and has to be nulled out. For example, when measuring liquid fuel quantity with a capacitive probe where only the reactive component is used for indicating purposes the conductivity of the fuel (which changes with different lots of fuel and with fuel temperature) may cause a large resistive signal component to be developed which tends to saturate a signal amplifier. Heretofore it has been proposed to detect the resistive signal component and use the resulting detected signal to drive an electromechanical followup apparatus to null or balance out the resistive signal component. In many instances where this technique is used the indicator presents a bulky, relatively expensive package because an extra electromechanical followup apparatus must be provided. Accordingly, it is the object of this invention to overcome the aforementioned problem and disadvantages.

It is another object of this invention to provide a fluid quantity indicating device whereby saturation of a signal amplifier therein is prevented by electronic feedback rather than by electromechanical followup.

Other objects and advantages will become apparent hereinafter and in the drawing. In describing the embodiment of the invention illustrated in the drawing, specific terminology will be used for the sake of clarity. It is not intended to be limited to the specific terms selected and it is to be understood that each specific term includes all technical equivalent which operate in a similar way to provide a similar function.

Turning now to the specific embodiment selected for illustration in the drawing there is shown a fluid quantity indicator device comprising a bridge 10, amplifiers 12, 14, demodulators 16, 18, modulators 20, 22, a phase shifter 24, a motor 26, and an indicator 28.

Bridge 10 includes an A.C. power source 30. Connected across source 30 is the primary winding 32 of a transformer 34 having a secondary winding 36 with end terminals 38, 40 and intermediate tap terminals 42, 44, 46, and 48. Potentiometers 50, 52 are connected across terminals 46, 48 and 48, 40 respectively. Terminal 44 is grounded as is one side of source 30. A potentiometer 54 is connected between terminal 42 and the wiper 56 of pot 50. Terminal 38 is connected to the input 58 of sensor 60. The output 62 of sensor 60 is connected to a summing terminal 64. A capacitor 66 is connected between the wiper 68 of pot 54 and terminal 64 and capacitor 70 is connected between the wiper 72 of pot 52 and terminal 64. Sensor 60 is represented by a capacitor 74 in parallel with a resistor 76. Resistor 76 represents leakage resistance between the electrodes of capacitor 74. The parallel combination of resistor 76 and capacitor 74 is connected between input 58 and output 62 of sensor 60.

Terminal 64 is connected to the input of amplifier 12.

The output of amplifier 12 is connected to an input 78 of demodulator 18 and to an input 80 of demodulator 16. The output of demodulator 16 is connected to an input 82 of modulator 20 and the output of modulator 20 connected to terminal 64. Demodulator 16 and modulator 20 in combination form a phase sensitive filter 84. Filter 84 provides negative feedback from the output to the input of amplifier 12 as will be explained hereinafter.

The ungrounded side of source 30 is connected to inputs 86, 88 of demodulator 16 and modulator 20 respectively and is also connected to the input of a phase shifter 24. The output of phase shifter 24 is connected to inputs 90 and 92 of demodulator 18 and modulator 22 respectively. The output of demodulator 18 is connected to input 94 of modulator 22 and the output of modulator 22 is connected to the input of amplifier 14. Demodulator 18 and modulator 22 form a phase sensitive filter 85. The output of amplifier 14 is connected to the input of motor 26. Motor 26 has a mechanical output means shown as dashed line 96 which is connected to the indicator 28 and wiper 68 of pot 54.

In operation, sensor 60 is located in a fluid container or tank. With no fluid in the container and with bridge 10 energized wiper 72 of pot 52 is adjusted so that the reactive current due to capacitor 70 is equal and opposite to the reactive current due to capacitor 74, with respect to summing terminal 64. With a full tank of fluid, wiper 56 of pot 50 is adjusted until indicator 28 registers a full tank. A relatively conductive fluid in the tank causes leakage resistance represented by resistor 76 to no longer be negligible as it is when the tank is empty. In practice resistor 76 may cause such a large resistive current at the input to amplifier 12 that saturation occurs which produces undesirable effects. To prevent saturation of the amplifier and to balance the bridge, negative feedback is developed by filter 84 connected between the output and input of amplifier 12.

Assume that a signal having a capacitive and resistive component is present at summing terminal 64. Both components are amplified by and appear at the output of amplifier 12. The amplified signal at the output of amplifier 12 is impressed across input 78 of demodulator 18 in filter 85 and across input 80 of demodulator 16 in filter 84. Demodulator 16 is insensitive to currents that are in quadrature with the resistive component of the amplifier signal (i.e., a capacitive current). The output of demodulator 16 is impressed across input 82 of modulator 20. The output of demodulator 16 is a D.C. voltage with an amplitude dependent upon the amplitude of the resistive voltage present at input 80. Quadrature voltage at input 80 does not result in a D.C. output. In this respect the demodulator 16 is phase sensitive. The D.C. voltage at the input 82 of modulator 20 is modulated by a signal impressed across input 88 of modulator 20. The signal at input 88 is in phase with the resistive component of current present at the summing point 64. Modulator 20 produces an output signal that is 180° out of phase with the resistive component of current at summing point 64, having a magnitude that is substantially equal to the magnitude of the resistive current at summing point 64.

Phase sensitive filter 84 (and 85) is similar in design and operation to the filter described in a patent issued to Jerome A. Fahley, entitled "Control Apparatus," No. 3,224,275, filed April 19, 1963, issued December 21, 1965, and assigned to the same assignee as the present application. Briefly, the phase sensitive filter described therein has an input signal with a resistive and a reactive (capacitive) component. Another input signal in phase with the resistive component causes demodulation and subsequent modulation of the resistive component and produces an output signal which can be used to null the corresponding resistive component present in the bridge.

With the negative feedback, as supplied, the output of amplifier 12 is relatively free of a resistive component. To further enhance the reactive component, although this is not strictly necessary unless very high accuracy is required, the output of amplifier 12 is fed to phase sensitive filter 85. Filter 85 is identical to filter 84 except that the demodulating and modulating voltage present at terminals 90 and 92 respectively is in phase with the reactive component at the input. The input voltage to phase shifter 24, supplied by source 30, is shifted 90° by shifter 24.

The output of filter 85, representing the reactive signal component developed in bridge 10, is amplified by amplifier 14 after which it is used to drive a phase sensitive motor 26. The output of motor 26 is mechanically connected (by means shown as dashed line 96) to drive indicator 28 and wiper 68 on potentiometer 54. Wiper 68 is driven in a manner to rebalance bridge 10 by balancing out the reactive current produced by the action of sensor capacitor 74.

The advantages of the apparatus as described are numerous. Reliability is increased by reducing the number of moving elements. The indicating apparatus package can be made smaller because bulky mechanical components are replaced by relatively small electronic components.

It is to be understood that the form of the invention herewith shown and described is to be taken as but one possible embodiment. Various changes can be made in the arrangement of components. Equivalent elements may be substituted for those illustrated and described herein. Certain features of the invention may be used independent of other features without departing from the spirit or scope of the invention as defined in the appended claim.

Having thus described my invention, I claim:

In combination with a signal source supplying a signal comprising first and second components in phase and out of phase, respectively, with a reference source, and an indicating means providing an output which is a function of the out of phase signal component;
   an amplifier having input and output means, said signal impressed across the input means, the amplifier operating to amplify the signal;
  means for demodulating the in phase components of the amplified signal, connected across the output means of said amplifier, the demodulating means providing a D.-C. signal which is a function of the amplitude of the amplified in phase component;
  means for modulating the D.-C. signal with a first signal provided by said reference source, the modulated signal being applied to said amplifier means to effect negative feed-back with respect to the in phase signal component;
  means for shifting the phase of the first signal provided by said reference, thereby providing a second signal, the phase shifted second signal having a phase corresponding to that of the out of phase signal component;
  means for demodulating the amplified out of phase signal component, connected across the output means of said amplifier, providing a D.-C. signal which is a function of the amplified out of phase signal component; and
  means for modulating the D.-C. signal that is a function of the amplified out of phase signal component with the phase shifted second signal, thereby providing a drive signal for said indicating means from which the in phase component has been eliminated.

References Cited by the Examiner

UNITED STATES PATENTS

| | | | |
|---|---|---|---|
| 3,047,815 | 7/1962 | Boose | 330—9 |
| 3,079,568 | 2/1963 | Werth | 330—9 |
| 3,114,262 | 12/1963 | Atun | 73—304 |

DAVID SCHONBERG, *Acting Primary Examiner.*

LOUIS R. PRINCE, *Examiner.*

C. ELLS, *Assistant Examiner.*